United States Patent [19]

Albrecht

[11] Patent Number: 4,850,162
[45] Date of Patent: Jul. 25, 1989

[54] ACCESS FLOOR SYSTEM

[75] Inventor: Raymond E. Albrecht, Sewickley, Pa.

[73] Assignee: H. H. Robertson Company, Pittsburgh, Pa.

[21] Appl. No.: 224,103

[22] Filed: Jul. 26, 1988

[51] Int. Cl.⁴ .......................... E04B 5/43; E04B 5/48
[52] U.S. Cl. ..................................... 52/126.6; 51/221
[58] Field of Search ..................... 52/98–100, 52/126.6, 126.7, 220, 221, 263; 174/48, 49, 47

[56] References Cited

U.S. PATENT DOCUMENTS

| 2,870,623 | 1/1959 | Murray | 52/220 |
| 2,975,559 | 3/1961 | Hedgren | 52/98 |
| 3,316,680 | 5/1967 | Chrastek | 52/126 |
| 3,398,933 | 8/1968 | Hardldson | 254/98 |
| 3,924,370 | 12/1975 | Cauceglia et al. | 52/126.6 |
| 4,016,357 | 4/1977 | Abrahamsen | 174/48 |
| 4,558,544 | 12/1985 | Albrecht et al. | 52/126.6 |
| 4,656,795 | 4/1987 | Albrecht et al. | 52/126.6 |

FOREIGN PATENT DOCUMENTS

| 676751 | 12/1963 | Canada | 174/49 |
| 1002517 | 2/1957 | Fed. Rep. of Germany | 52/220 |
| 1306680 | 9/1962 | France | 52/126.6 |

Primary Examiner—James L. Ridgill, Jr.
Attorney, Agent, or Firm—G. E. Manias

[57] ABSTRACT

An elevated access floor, or pedestal floor wherein a two-cell duct element spans one or more support pedestals is disclosed. The duct element distributes two different services, such as high and low voltage wiring to various locations in the access floor area. A feeder unit having removable covers extends transversely of the duct element and serves to feed the wiring of the two services from central locations, such as a telephone closet and a power closet, to the duct elements.

19 Claims, 4 Drawing Sheets

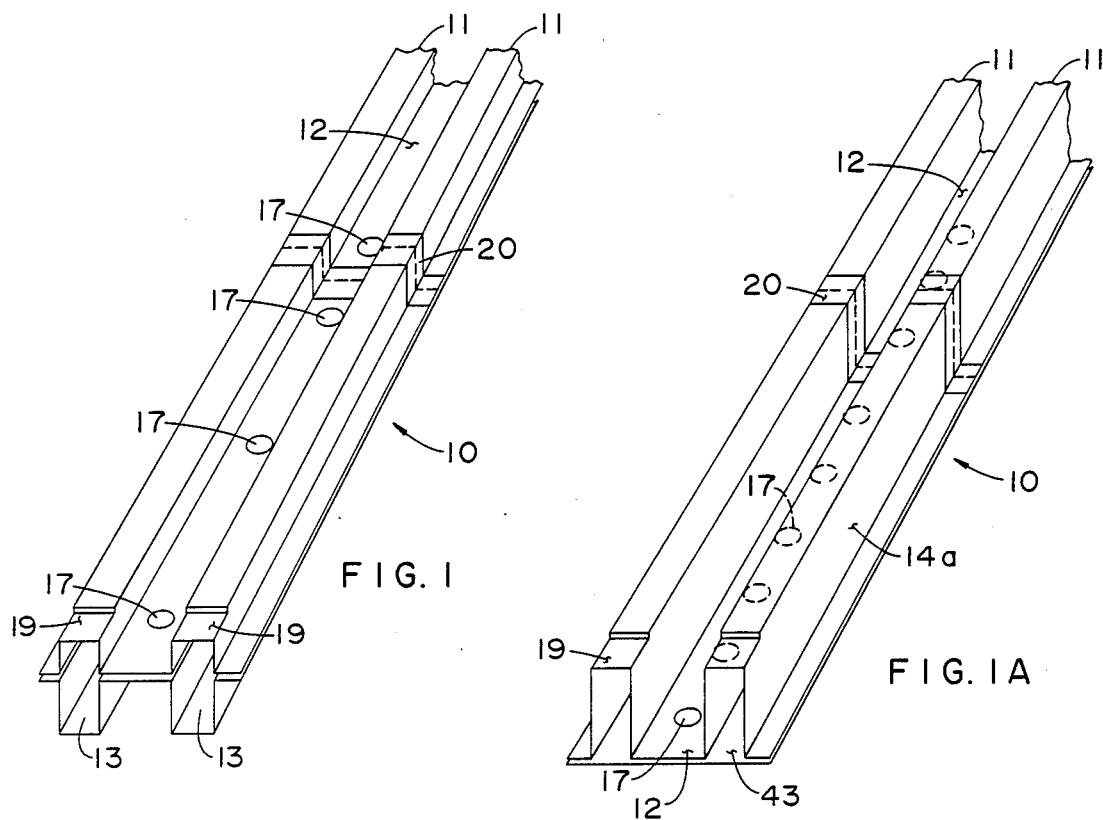
FIG. 1
FIG. 1A
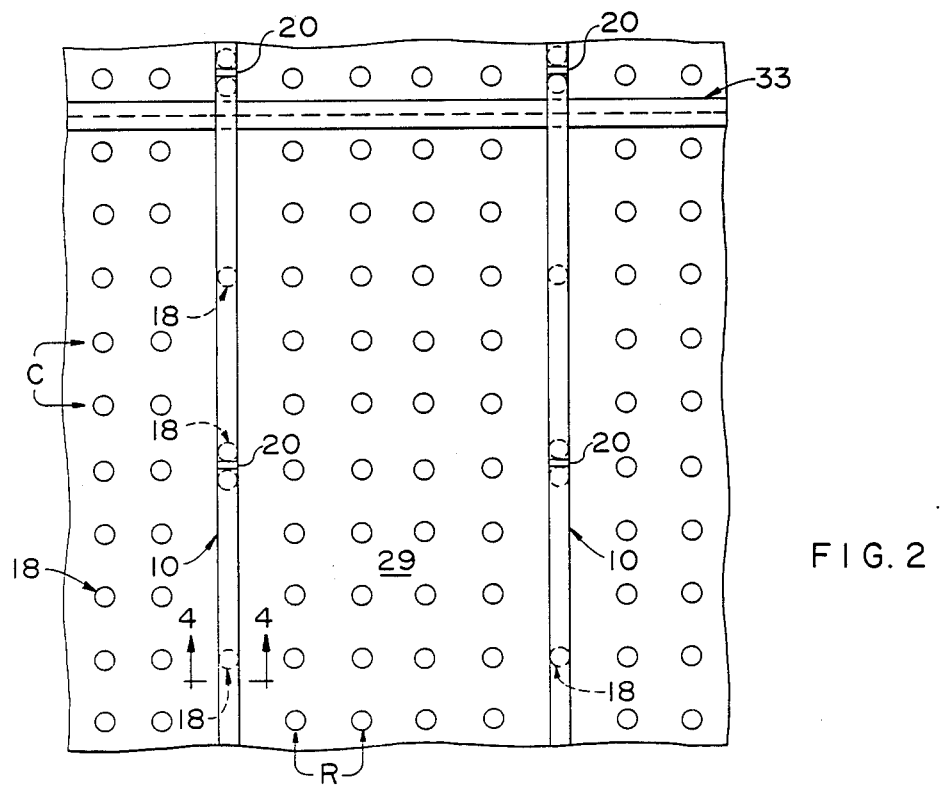
FIG. 2

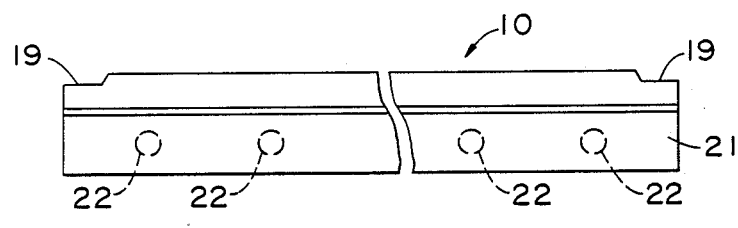
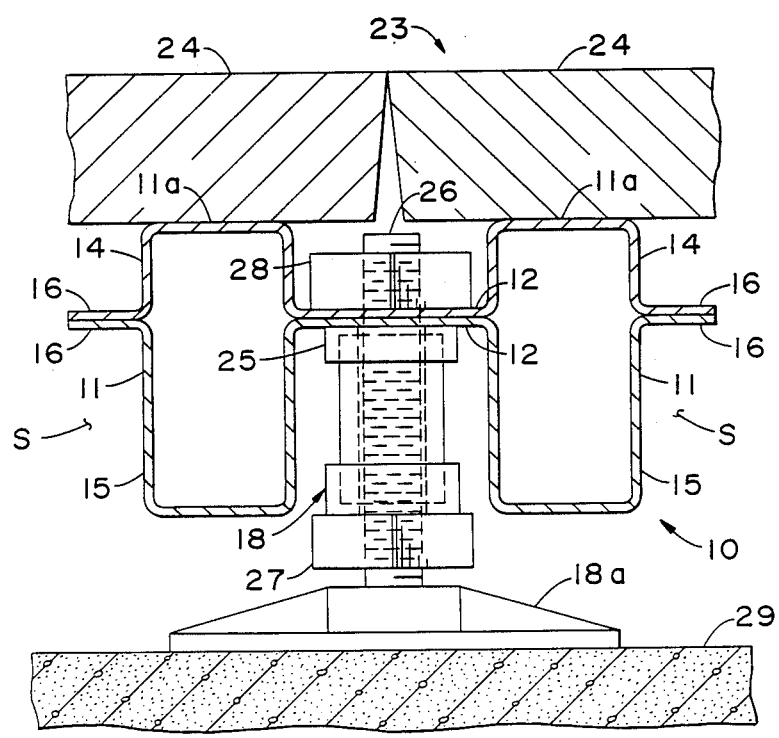

ACCESS FLOOR SYSTEM

FIELD OF THE INVENTION

The present invention relates to access floor systems, particularly to those used in elevated floor systems wherein the floor is raised above a supporting subfloor, having high and low voltage wiring distributed between the elevated floor and the subfloor in order to service equipment at various locations on the floor.

BACKGROUND OF THE INVENTION

Elevated floor assemblies, also called full access floor assemblies, comprising a raised floor supported a spaced distance above a permanent or otherwise supporting subfloor, are in general use in contemporary buildings, particularly in areas used for housing computers and computer-related systems. Computers, printers, and other peripherals, etc., are typically interconnected by cables, pipes, air ducts, and the like for the purpose of powering and coordinating the various units and maintaining each unit at its required operating temperature. The elevated floor assembly enables these interconnections to be routed and channeled in the space defined by the raised floor and the supporting subfloor below.

The standard elevated floor structure consists of floor panels, such as those disclosed in U.S. Pat. No. 4,656,795, which are supported above a subfloor, generally by a plurality of pedestals, such as those described in U.S. Pat. Nos. 4,558,544 and 3,398,933.

A significant problem associated with prior elevated floor systems is that the interconnections of wires, cables, pipes, etc., referred to above become increasingly crowded and increasingly tangled as more systems, peripherals, etc., are added to the system. A mild example of this problem can be seen in U.S. Pat. No. 4,016,357, showing several crossing lines below the elevated floor structure depicted therein.

Another related problem with prior systems is that they provide no method for segregating wiring which should be segregated, such as high and low voltage wiring. Systems such as that disclosed in U.S. Pat. No. 3,316,680, which shows a single trough fastened to the tops of pedestals, would be unable to effectively solve the segregation problem, and would thus be of limited use in present-day applications.

Accordingly, it would be desirable to have an elevated floor system that addressed the problems of tangled lines and the need for segregation in the space between the elevated floor and the supporting subfloor.

SUMMARY OF THE INVENTION

The present invention comprises an elevated floor having a duct element which significantly reduces the line tangling problems of prior elevated floor systems and permits various lines to be segregated as needed. The duct element comprises a pair of generally parallel cells joined together in a spaced-apart relationship. Each element is secured to a row of a plurality of pedestals, such that a cell is disposed on each side of the row of pedestals. The interconnecting electrical cables, hookup lines, etc., are run through the cells, thereby significantly reducing the tangled, random line network of prior systems. Each cell may be used for running compatible wiring, segregating that wiring from that in the other cell.

In one preferred embodiment of the invention, the duct element assists the pedestals in supporting the elevated floor, while in another preferred embodiment, the duct elements are disposed a spaced distance below the elevated floor and render no support therefor. In yet another preferred embodiment of the invention, feeder ducts extend transversely of the duct elements and communicate with the cells.

Other details, objects and advantages of the invention will become apparent as the following description of the presently preferred embodiments and presently preferred methods of practicing the invention proceeds.

BRIEF DESCRIPTION OF THE DRAWINGS

In the accompanying drawings, the preferred embodiments of the invention and preferred methods of practicing the invention are illustrated in which:

FIG. 1 is an isometric illustration of a preferred duct element of the present invention.

FIG. 1a is an isometric view of an alternative embodiment of a duct element of the present invention.

FIG. 2 is a plan view schematically illustrating an elevated floor system showing pedestals and a pair of the duct elements of the present invention cooperating with a feeder duct.

FIG. 3 is a side view of a duct element of the present invention.

FIG. 4 is a cross-sectional view, taken along the line 4—4 of FIG. 2, showing a preferred embodiment of the present invention.

DETAILED DESCRIPTION OF THE INVENTION

Figure 5:
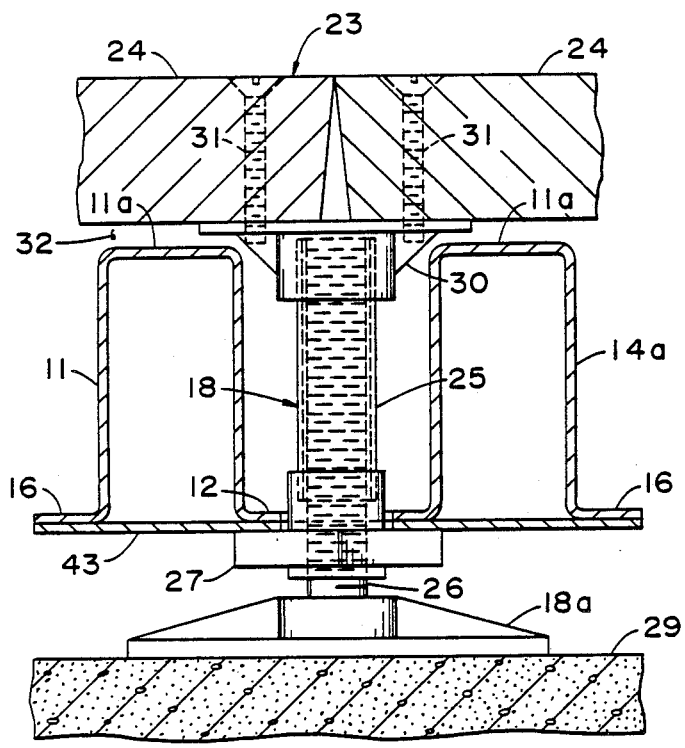
FIG. 5 is a cross-sectional view, similar to FIG. 4, showing another preferred embodiment of the present invention.

FIG. 1 illustrates a preferred embodiment of a duct element used in practicing the present invention. As shown, the duct element, generally 10, presents a pair of spaced-apart, generally parallel cells 11 having hollow interiors 13, through which wiring (not shown) may be passed, and maintained in a relatively disentangled state. As illustrated in FIG. 4, the duct element 10 may be formed from upper and lower corrugated members 14, 15 having contiguous portions, such as, central spacer portions 12 and outwardly extending ribs 16. The members 14, 15 may be spot welded or otherwise secured together along the contiguous portions 12, 16.

As further illustrated in FIG. 1, the spacer portion 12 has a plurality of pedestal openings 17 which allow the duct element 10 to be mounted on plural pedestals 18 of a row of pedestals, as will hereinafter be described. As illustrated in FIG. 2, the pedestals 18 are arranged in an array of rows R and columns C, the spacing for which is generally dictated by the horizontal dimensions of the raised access floor panels which are supported on these pedestals, the loading requirements for the particular elevated floor and the loading capacity of the individual pedestals used. The pedestals 18 rest on and preferably are secured to a support surface 29, such as a concrete subfloor. As shown in FIGS. 2 and 4, the duct elements 10 straddle a row of pedestals 18 such that one of the cells 11 is disposed on each side of the row of pedestals 18 that is, each cell 11 is laterally offset from the pedestals of the row of pedestals 18. As further illustrated in FIG. 2, more than one duct element 10 may be used, and a second duct element may be spaced from the first duct element and similarly secured to a second row of pedestals 18, such that one of the cells is disposed on each side of the second row of pedestals, that is, each of the cells 11 is laterally offset from the pedestals of the second row.

As also illustrated in FIG. 1, the duct element 10 may have at either end a recessed portion 19, which may be dimensioned and shaped to receive a lap strip 20, used to secure adjoining sections of the duct elements 10 together as shown. Alternatively, the adjoining sections may be joined in a male end/female end-type fashion.

FIG. 3 illustrates a side elevation of a section of the duct element 10. As shown, the cells 11 of the duct element 10 generally include in the outboard vertical webs 21 of the cell, a plurality of knock-outs 22, for egressing the various wires running through the cells 11 in order to access the equipment on the elevated floor. These knock-outs 22 generally provide communication between each of the cells and the plenum space S (FIG. 4) between the access floor panels 24 and the supporting surface 29.

FIG. 4 illustrates a preferred method of mounting a duct element 10 on a pedestal 18, which has a base 18a resting on a subfloor 29, such as a concrete slab. In the embodiment illustrated in FIG. 4, each cell 11 of the duct element 10 has an upper surface 11a which assists in supporting the elevated floor, generally 23. As shown, a relatively small portion of the cell resides above the top of the pedestal 18, while a relatively major portion of the cell resides below the top of the pedestal 18. As illustrated in this embodiment, the elevated floor 23 is comprised of multiple access floor panels 24. The duct element 10 is secured to the pedestal 18 by sliding the pedestal opening 17 in the spacer portion 12 down over the pedestal column 26 until the spacer portion 12 comes to rest on an adjustable collar 25 on the pedestal 18. The adjustable collar 25 may be a pipe with enlarged end portions which is slidably disposed on the pedestal column 26. The pedestal column 26 may be threaded as shown, in which case a pedestal adjusting nut 27 on which the collar 25 rests may be used to adjust the collar 25 vertically as required, in order to position the cells 11 in supporting engagement with the access floor 23 as illustrated. Once the desired level of adjustment has been achieved, the duct element may be secured in place, as with a top locking nut 28, which is threaded down into locking engagement with the spacer portion 12.

When positioned on the pedestal 18 in this way, each of the cells 11 of the duct element 10 is disposed on opposite sides of the particular row of pedestals 18 cooperating with the duct element. The duct element of the FIG. 4 embodiment acts in a dual capacity, as a combined stringer for supporting in part the elevated floor 23, and as a dual cell arrangement for containing and segregating various wires and other interconnections running below the floor 23. Referring again to FIGS. 2 and 4, and assuming this Figure represents a plan view of a floor system using the embodiment illustrated in FIG. 4, it is evident that the duct element 10 supports those portions of the elevated floor 23 which are directly over the duct elements 10. However, areas of the floor 23 which are not directly over the duct elements 10 are supported by the pedestals 18. Thus, in the case of the FIG. 4 embodiment, certain of the floor panels 24 are supported in part by the pedestals 18 and in part by the duct element 10.

An alternative preferred embodiment of the present invention is illustrated in FIG. 5. In this embodiment, the access floor panels 24 are supported directly by the pedestals 18 rather than by the cells 11, and the duct element 10 resides entirely below the top of the pedestal 18. In the embodiment illustrated in FIG. 5, the adjustable collar 25 includes an upper platform 30 which supports the access floor panels as shown. The access floor panels may be secured to the upper platform 30 by fasteners 31, such as hold-down screws, which are placed at all four intersecting corners of the panels 24, which corners are supported by the pedestal 18. In such a configuration, there generally exists a space 32 between the panels 24 and the top surface 11a of the cells 11.

In the FIG. 5 embodiment and as illustrated in FIG. 1a, the duct element 10 is formed from an upper corrugated member 14a and a flat lower member 43 which is coextensive in width and length with the upper member 14a. The upper member 14a of the cells 11 has flared ribs 16 which along with the spacer portion 12 may be attached to the flat lower member 43 as earlier described. The cells 11 and upper platform 30 are simultaneously adjusted vertically by turning the nut 27 in the appropriate direction on the threaded pedestal column 26.

Figure 6:
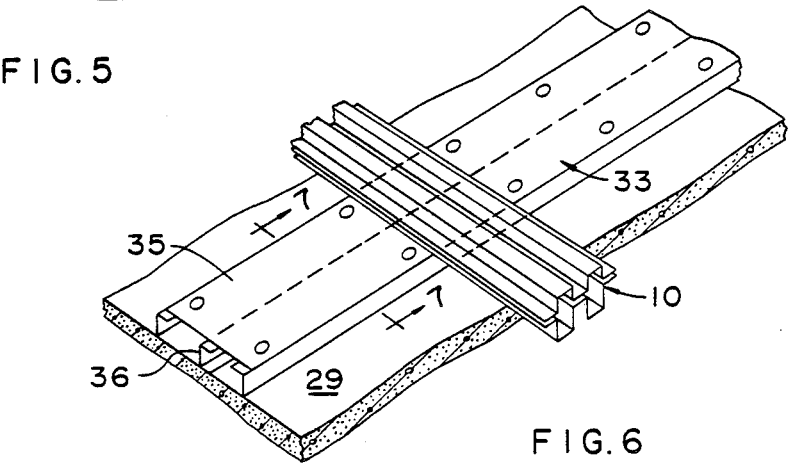
FIG. 6 is an isometric view of a preferred duct element of the present invention being used in cooperation with a feeder duct.
Figure 7:
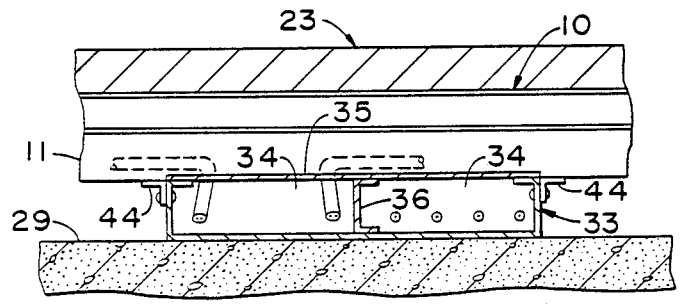
FIG. 7 is a cross-sectional view taken along the line 7—7 of FIG. 6.

As illustrated in FIG. 6, either of the FIG. 4 or FIG. 5 embodiments of the present invention may be used in cooperation with a feeder duct 33 which extends transversely of and beneath the duct element 10, and which overlies the subfloor or support surface 29. As illustrated in FIG. 7, the feeder duct 33 may rest on the supporting surface 29, and communicates with the cells 11. If the feeder duct rests on the supporting surface 29, it may be necessary to use shims (not shown) under the feeder duct 33 if the supporting surface is irregular or out of plane. The duct elements 10 may be attached to the feeder duct in any practical manner, such as by use of L-shaped clips 44 (FIG. 7) which are welded or rivited at the intersecting corners of the duct element 10 and feeder duct 33.

Like the duct element 10, the feeder duct 33 is segregated into two compartments, 34. One compartment 34 may be used for high voltage, such as power wiring, and accesses one of the cells 11, which cell is used for a corresponding purpose, and the other compartment 34 may be used for low voltage service, such as telephone and computer wiring, and likewise accesses the other cell 11, which is used for a corresponding purpose.

As further illustrated in FIG. 6, the feeder duct 33 preferably has removable covers 35, which may be removed to access the compartments 34 therein. Also, the feeder duct 33 preferably has a divider 36 which segregates the interior of the feeder duct 33 into the separate compartments 34.

FIG. 7 illustrates the duct element 10 at a point of intersection with the feeder duct 33. As shown, the cells 11 rest on the feeder duct 33. In this illustration (FIG. 7), one of the cells 11 is accessed by the electrical wires, and the other of the cells 11, which is not seen, would be accessed by the telephone/computer wires.

Figure 8:
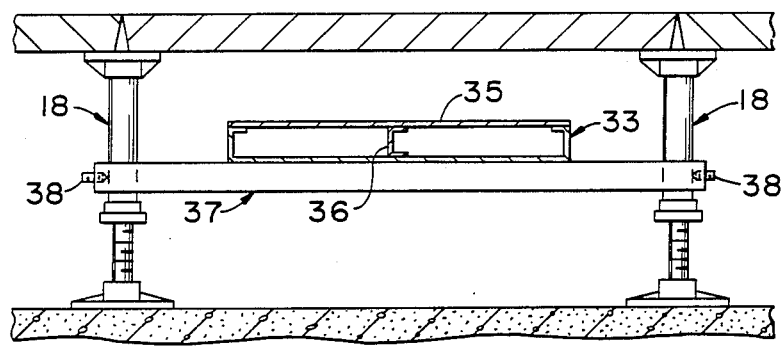
FIG. 8 is an elevation view in partial cross section of a preferred embodiment of the present invention, illustrating a method of supporting the feeder duct.

FIG. 8 illustrates a method of supporting the feeder duct 33 on the pedestals 18 in situations where the height of the floor 23 is equal to or greater than seven inches. As shown, the feeder duct 33 may be supported by support stringers 37, which span between two adjacent pedestals 18 and are secured thereto, as by pointed set screws 38. In order to adjust the height of the feeder duct 33, the set screws are loosened and the stringer 37, which is slidably received by the pedestal 18, is slid up or down on the pedestal as desired to the required position and the set screws are tightened. In this embodiment, the duct elements would rest on the feeder ducts as earlier described.

Figure 9:
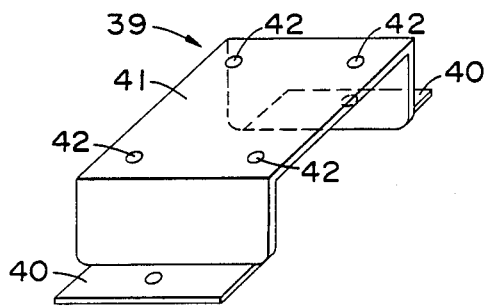
FIG. 9 is an isometric view of an optional hold-down clip for use with a preferred embodiment of the present invention.
Figure 10:
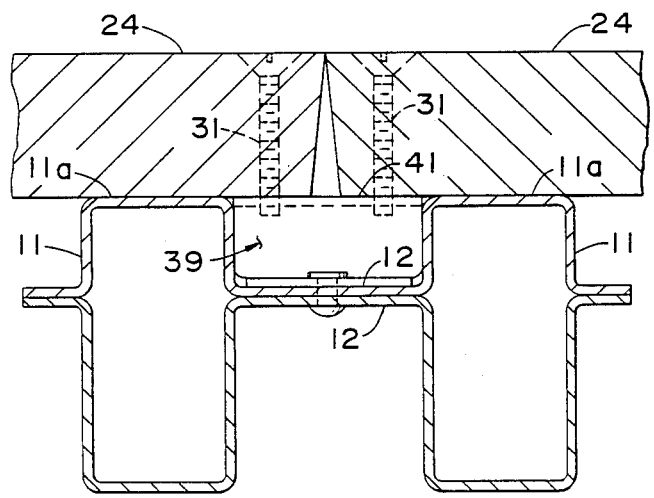
FIG. 10 is a partial cross sectional view of a preferred embodiment of the present invention showing the use of the optional hold-down clip of FIG. 9.

FIGS. 9 and 10 illustrate an optional hold-down clip for use in providing further stability to the system illustrated in FIG. 4, without the need for stringers. As shown in FIG. 9, the hold-down clip, generally 39, comprises a saddle-shaped member having a pair of attachment flanges 40, which permit the clip 39 to be attached to the spacer portion 12 as illustrated in FIG. 10. The attachment may be by any means, such as spot welding, or field installed break stem rivets.

As further illustrated in FIGS. 9 and 10, the clip 39 has a top wall 41 which, when the clip is positioned on the spacer portion 12, is disposed at substantially the same height as the top surface 11a of the cells 11. The top wall 41 preferably includes a plurality of threaded holes 42 into which the fasteners, or panel hold down screws 31 are threaded in order to secure the access floor panels 24 to the clip 38, as shown in FIG. 10.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims. For example, it would be evident to those skilled in the art that each of the cells 11 could be subdivided into two or more compartments by a dividing means to offer even greater segregation capabilities.

I claim:

1. In an access floor arrangement the combination comprising:
    a support surface;
    a plurality of support pedestals disposed on said support surface in a predetermined array of rows and columns, said pedestals having top ends;
    a duct element secured to pedestals of a row of said pedestals, said duct element having at least one cell, said cell being laterally offset from the pedestals of said row of said pedestals, at least a major portion of said duct element residing below the top ends of the pedestals of said row of said pedestals; and
    a plurality of floor panels supported by said pedestals.

2. The access floor arrangement as defined in claim 1 wherein certain of said floor panels are supported in part by said pedestals and in part by said duct element.

3. The access floor arrangement as defined in claim 1 wherein said cell presents outboard faces having knockouts for providing communication between said cell and the space between said floor panels and said supporting surface.

4. The access floor arrangement as defined in claim 1 including a second duct element spaced from the first said duct element and secured to pedestals of a second row of said pedestals, said second duct element having at least one cell, said cell being laterally offset from the pedestals of said second row of said pedestals.

5. The access floor arrangement of claim 1 wherein said duct element resides entirely below the tops of said support pedestals, and all of said floor panels are supported directly on said pedestals.

6. The access floor arrangement as defined in claim 1 including:
    a feeder duct extending transversely of said duct element, overlying said support surface and extending beneath said duct element.

7. The access floor arrangement as defined in claim 6 wherein said feeder duct is in communication with said cell.

8. An access floor arrangement comprising:
    a support surface;
    a plurality of pedestals disposed on said support surface in a predetermined array of rows and columns, each of said pedestals having a top end;
    a duct element secured to pedestals of a row of said pedestals, said duct element having a pair of spaced-apart cells, one of said cells being disposed on each side of the pedestals of said row of pedestals; and
    a plurality of floor panels supported by said pedestals, such that a plenum space exists between said floor panels and said support surface.

9. The access floor arrangement as defined in claim 8 wherein said spaced-apart cells are joined together by a spacer portion, said spacer portion having at least one opening therein for receiving a portion of said pedestal therethrough.

10. The access floor arrangement as defined in claim 8 wherein at least one end of said duct element has a recessed portion for receiving a lap strip for joining said element to one or more duct elements.

11. The access floor arrangement as defined in claim 8 wherein said cells have outboard webs with at least one opening therein for providing communication between said cells and said plenum space.

12. The access floor arrangement as defined in claim 8 including a second duct element spaced from the first said duct element and secured to pedestals of a second row of pedestals, said second duct element having a pair of spaced-apart cells, one of said cells being disposed on each side of said pedestals of said second row of said pedestals.

13. The access floor arrangement of claim 8 wherein a substantial portion of said duct element is disposed below the top end of said pedestals, said cells having a top surface which provides at least partial support for said floor panel.

14. The access floor arrangement of claim 8 wherein said duct element resides entirely below the top end of said pedestals.

15. The access floor arrangement of claim 8 further including a hold-down clip, said clip being attached to said duct element and being adapted to enable said panels to be fastened thereto and held down thereby.

16. The access floor arrangement as defined in claim 8 wherein a feeder duct extends transversely of said duct, said feeder duct overlying said support surface and extending beneath said duct element.

17. The access floor arrangement as described in claim 16 wherein said feeder duct includes a divider means segregating the interior of said feeder duct into separate compartments, each said compartment being in communication with one said cell.

18. The access floor arrangement of claim 16 wherein said feeder duct is supported by a support stringer, said support stringer being fastened to adjacent ones of said pedestals.

19. The access floor arrangement of claim 16 wherein said feeder duct rests on and is supported by said support surface.

* * * * *